United States Patent [19]

Suzuki et al.

[11] Patent Number: 5,048,503
[45] Date of Patent: Sep. 17, 1991

[54] AUTOMATIC POWER INTERRUPTING SYSTEM FOR VEHICULAR CONTROL CIRCUIT

[75] Inventors: Kazuo Suzuki, Tokyo; Yoshiki Yuzuriha, Isesaki, both of Japan

[73] Assignees: Fuji Heavy Industries, Ltd., Tokyo; Japan Electronic Control Systems Co., Ltd., Isesaki, both of Japan

[21] Appl. No.: 603,448

[22] Filed: Oct. 26, 1990

[30] Foreign Application Priority Data

Jan. 12, 1989 [JP] Japan ................................. 1-138636

[51] Int. Cl.⁵ .............................................. F02P 11/00
[52] U.S. Cl. .............................. 123/632; 123/146.5 D; 123/198 D; 307/10.7
[58] Field of Search ........ 123/179 BG, 179 B, 198 D, 123/198 DC, 146.5 D, 632

[56] References Cited

U.S. PATENT DOCUMENTS

| 1,921,974 | 8/1933 | Jolivet et al. | 123/146.5 D |
| 1,923,615 | 8/1933 | DeFlugue et al. | 123/146.5 D |
| 2,790,841 | 4/1957 | Sekul et al. | 123/146.5 D |
| 4,368,717 | 1/1983 | Roberts et al. | 123/146.5 D X |

FOREIGN PATENT DOCUMENTS 59-62245 4/1984 Japan .

*Primary Examiner*—Tony M. Argenbright
*Attorney, Agent, or Firm*—Foley & Lardner

[57] ABSTRACT

An automatic power interrupting system for a vehicular control circuit including a relay switch having a contact connected between a power source and the supply terminal of a control circuit and a relay coil connected with the power source, a control switch connected between the power source and the supply terminal and with the signal input terminal of the control circuit and turned on only by an external force, a revolution detector for detecting engine revolutions and a switching device for turning the relay switch on when power is supplied to the circuit and off after a predetermined time period measured after stop of the engine based on a signal from the revolution detector. A second embodiment includes a kill switch connected together with an ignition circuit and a power source, a relay switch having a contact connected between the power source and the supply terminal of the control circuit and a relay coil connected between the power source and the signal output terminal of the control circuit, a starter switch connected with a starter between the power source and the supply terminal and with the signal input terminal of the control circuit, a revolution detector for detecting engine revolutions and a switch for turning the relay switch on when the power is supplied to the circuit and off after a predetermined time period measured after stop of the engine based on a signal from the revolution detector.

2 Claims, 2 Drawing Sheets

AUTOMATIC POWER INTERRUPTING SYSTEM FOR VEHICULAR CONTROL CIRCUIT

BACKGROUND OF THE INVENTION (1) Field of the Invention

The present invention relates to an automatic power interrupting system for a vehicular control circuit.

(2) Description of the Prior Art

A power supply system for the vehicular control circuit according to the prior art may be left as it is with the key switch being ON.

In case the engine stalls (or stops), the key switch could be left ON.

In other words, there is known an emergency engine stop system. In this system, fuel injections by fuel injection valves are interrupted in response to either an emergency stop signal which is automatically issued or an emergency signal coming from a kill switch to be operated by the driver which switch is either attached to the vicinity of the grip of the handle of an motorcycle so that it may be operated by the driver or turned off when the driver leaves the body of a snowmobile because the driver and the snowmobile body are bound with a rope or the like. If the kill switch is turned off, the key switch could be left ON.

This raises in the prior art a problem that the battery is caused to die by leaving the key switch ON.

SUMMARY OF THE INVENTION

In view of the above-specified problem of the prior art, therefore, an object of the present invention is to provide an automatic power interrupting system for a vehicular control circuit, which can interrupt the power supply to the control circuit even in case the engine stalls or is stopped and left as it is stalling by the use of the kill switch.

According to a feature of the present invention, there is provided an automatic power interrupting system for a vehicular control circuit, which comprises: a relay switch having a normally open contact connecting between a power source and the supply terminal of a control circuit and a relay coil connected with said power source; a normally open control switch connected between said power source and said supply terminal and with the signal input terminal of said control circuit and adapted to be turned on only when an external force is applied thereto; revolution detecting means for detecting the revolutions of an engine; and switching means for turning on said relay switch, when the power is supplied to said control circuit, and off said relay switch after a predetermined time period by measuring the time period after the stop of the engine revolutions on the basis of a detection signal outputted from said revolution detecting means.

According to another feature of the present invention, there is provided an automatic power interrupting system for a vehicular control circuit, which comprises: a kill switch connected together with an ignition circuit with a power source; a relay switch having a normally open contact connected between said power source and the supply terminal of said control circuit and a relay coil connected between said power source and the signal output terminal of said control circuit; a starter switch connected together with a starter between said power source and said supply terminal and with the signal input terminal of said control circuit; revolution detecting means for detecting the revolutions of the engine; and switching means for turning on said relay switch, when the power is supplied to said control circuit, and off said relay switch after a predetermined time period by measuring the time period after the stop of the engine revolutions on the basis of a detection signal outputted from said revolution detecting means.

According to the first feature of the present invention, an engine running signal is fed to the signal input terminal, when the control switch is pushed and turned on, so that the power is supplied to the control unit. Then, the relay switch is turned on by the action of the switching means. From now on, the power of the control unit is continuously held even if the control switch is released from the push. The engine is then started to revolve. In case the engine stalls, the relay switch is then turned off by the action of the switching means after lapse of a predetermined time period from the stalling of the engine. As a result, the power to the control unit is interrupted.

Thus, even if the engine stalls or is left as stalling by using the kill switch, the power to the control unit is turned off after the predetermined time period so that the restartability of the engine can be improved without any death of the battery.

According to the second feature of the present invention, the engine running signal is fed to the signal input terminal, if the kill switch is turned on to turn on the starter switch, so that the power is fed to the control unit. Then, the relay switch is turned on by the action of the switching means.

From now on, the power to the control unit is continuously held even if the starter is turned off. After this, the engine restarts its revolutions.

The engine is stopped by turning off the kill switch. When the engine is stopped for a predetermined time period after the kill switch is turned off, the relay switch is turned off by the action of the switching means. As a result, the power to the control unit is interrupted.

In case, therefore, the engine stalls or is stopped by using the aforementioned kill switch, the power to the control unit is interrupted after lapse of the predetermined time period from the engine stalling, thus eliminating the problem that the battery would otherwise die.

DESCRIPTION OF THE PREFERRED EMBODIMENTS

The present invention will be described in the following in connection with the embodiments thereof with reference to the accompanying drawings.

Figure 1:
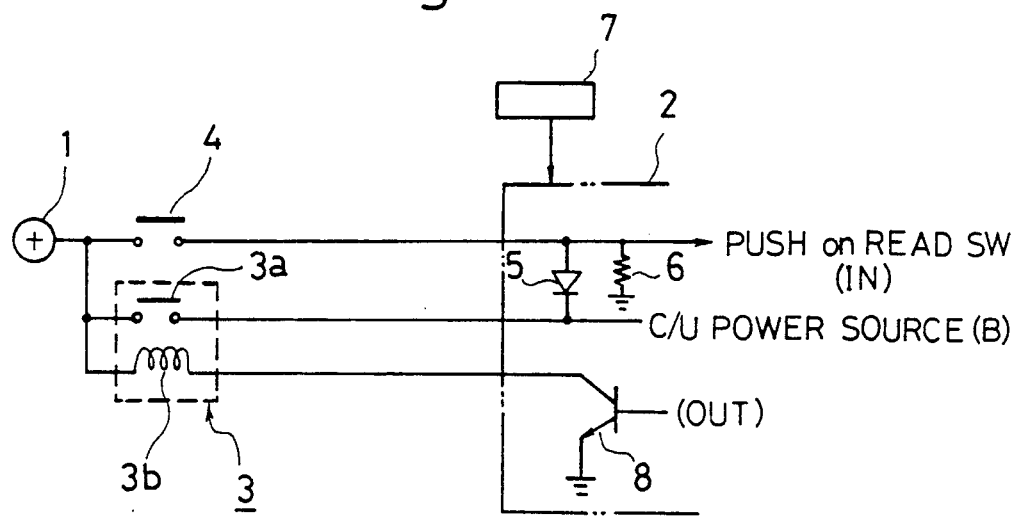
FIG. 1 is a circuit diagram showing one embodiment of the automatic power interrupting system for a vehicular control circuit according to the first feature of the present invention.
Figure 2:
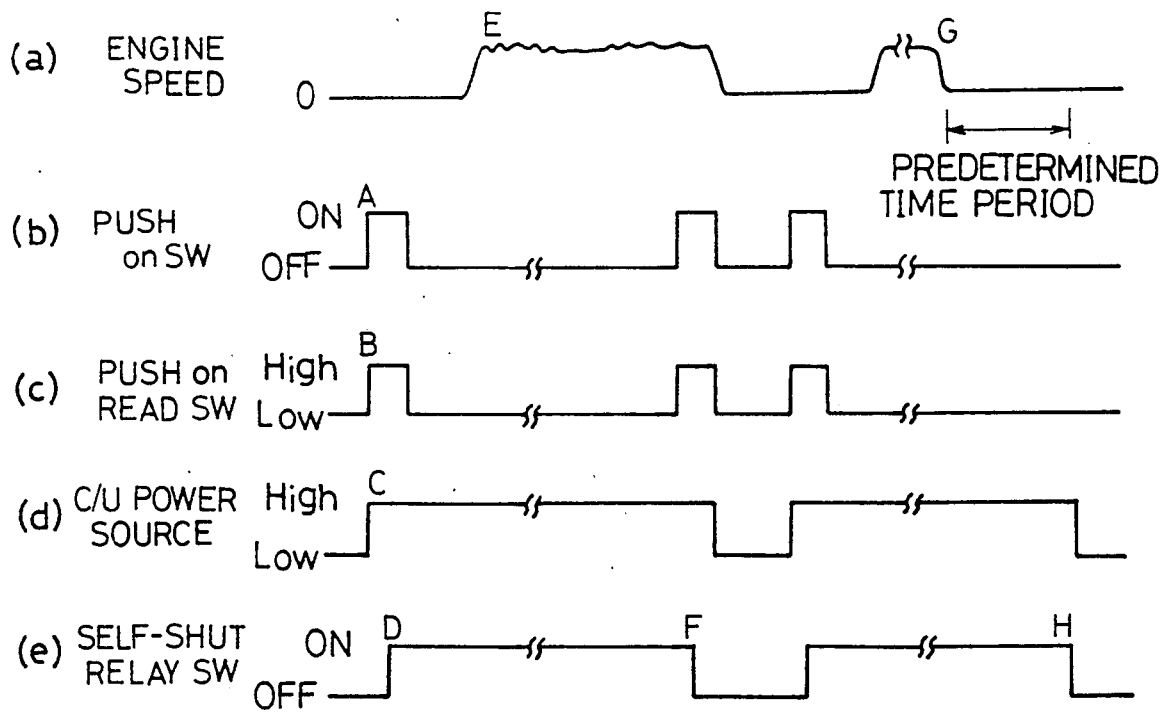
FIGS. 2A to 2E are time charts for explaining the operation of the same embodiment.

The embodiment of the first feature of the present invention is shown in FIGS. 1 and 2.

In FIG. 1, there is connected between a power source 1 and the supply terminal B of a control circuit in a control unit 2 a normally open contact 3a of a self-shut relay switch 3. This self-shut relay switch 3 has its relay coil 3b connected between the power source 1 and a signal output terminal OUT of the control circuit.

A push-on switch 4 acting as the control switch is connected between the power source 1 and the supply terminal B and with a signal input terminal IN of the control circuit. This push-on switch 4 is a normally open switch which is turned on only when an external force such as pushing force is applied thereto.

Incidentally, reference numeral 5 designates a diode, and numeral 6 designates a resistor.

There are further provided revolution detecting means 7 for detecting the revolutions of the engine, and switching means which is made operative to turn on the self-shut relay switch 3, when the power to the control unit is ON, and off the relay switch 3 after a predetermined time period by measuring the time period after the stop of the engine revolutions on the basis of a detection signal outputted from the revolution detecting means 7. The switching means is composed of a transistor 8 or the like which is operated by an instruction coming from the control unit 7. The transistor 8 has its collector terminal connected with the relay coil 3b of the self-shut relay switch 3 and its control (base) terminal connected with the aforementioned signal output terminal OUT.

Next, the operations of the automatic power interrupting system thus constructed will be described with reference to FIGS. 1 and 2.

First of all, when the push-on switch 4 is pushed and turned on (as indicated at A in FIG. 2B), the engine running signal at a High level is fed to the signal input terminal IN (as indicated at B in FIG. 2C) so that the power is supplied to the control unit 2 (as indicated at C in FIG. 2D). Then the signal at the High level is fed from the signal output terminal OUT to the control terminal of the transistor 8. As a result, the transistor 8 is rendered conductive so that the power is supplied to the relay coil 3b of the self-shut relay switch 3 to turn on the self-shut relay switch 3 (as indicated at D in FIG. 2E). From now on, the power to the control unit 2 is continuously held even if the push-on switch 4 is released. Then, the engine starts it revolutions (as indicated at E in FIG. 2A). If the push-on switch 4 is pushed and turned on again, the signal at the High level is fed to the signal input terminal IN. Then, a signal at a Low level is fed from the signal output terminal OUT to the control terminal of the transistor 8. As a result, the transistor 8 is rendered inconductive to interrupt the power to the relay coil 3b of the self-shut relay switch 3 so that this relay switch 3 is turned off (as indicated at F in FIG. 2E).

Thus, the power to the control unit 2 is interrupted. After this, the engine stops its revolutions.

In this case, another off-switch may be provided to turn off the self-shut relay switch 3 when the push-on switch 4 is turned on. Alternatively, the power may be held a certain time for the restart although the engine revolutions are stopped by the push-on switch 4. Moreover, the control unit 2 may turn off the power by itself after lapse of a certain time after the engine has been stopped by a kill switch (for cutting the ignitions) and left as it is.

Next, in case the engine stalls or is stopped by using the aforementioned kill switch (as indicated at G in FIG. 2A), the signal at the low level is fed from the signal output terminal OUT to the control terminal of the transistor 8 after lapse of a predetermined time period from the engine stop. Then, the transistor 8 is rendered inconductive to interrupt the power to the relay coil 3b of the self-shut relay switch 3 thereby to turn off the self-shut relay switch 3 (as indicated at H in FIG. 2A). As a result, the power to the control unit 2 is interrupted.

Thus, the power to the control unit 2 is turned off after the predetermined time period even if the engine stalls or is left as stalling by using the kill switch. Thus, the restartability of the engine can be improved without the death of the battery.

Next, the embodiment of the second feature of the present invention will be described in the following with reference to FIGS. 3 and 4.

Figure 3:
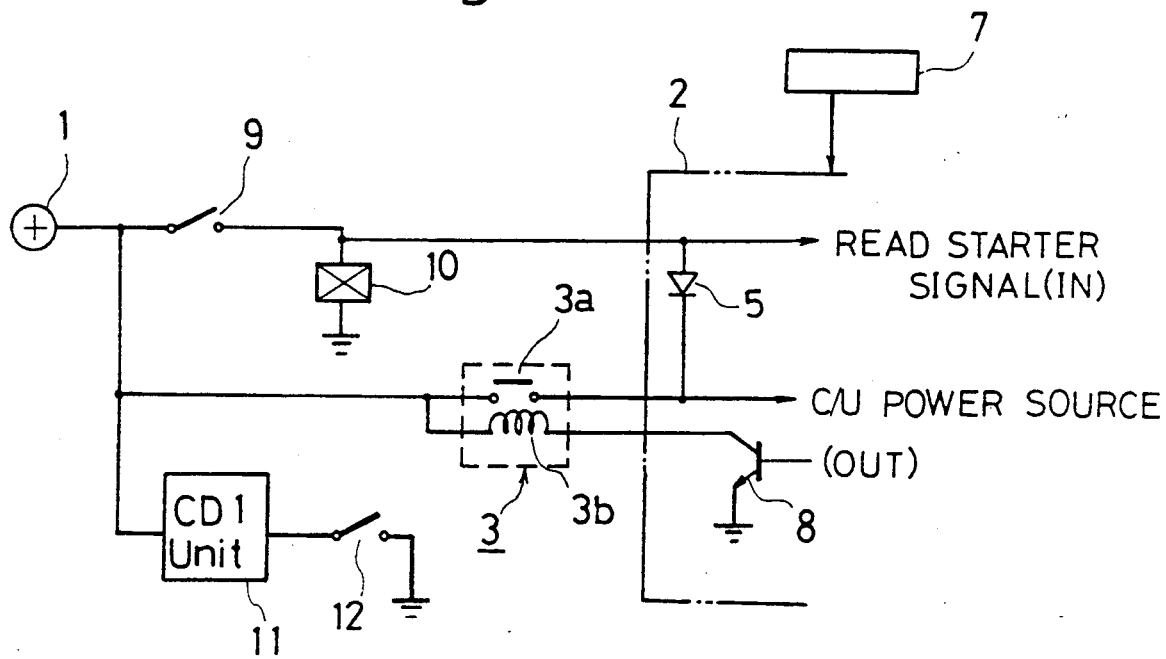
FIG. 3 is a circuit diagram showing another embodiment according to another feature of the present invention.
Figure 4:
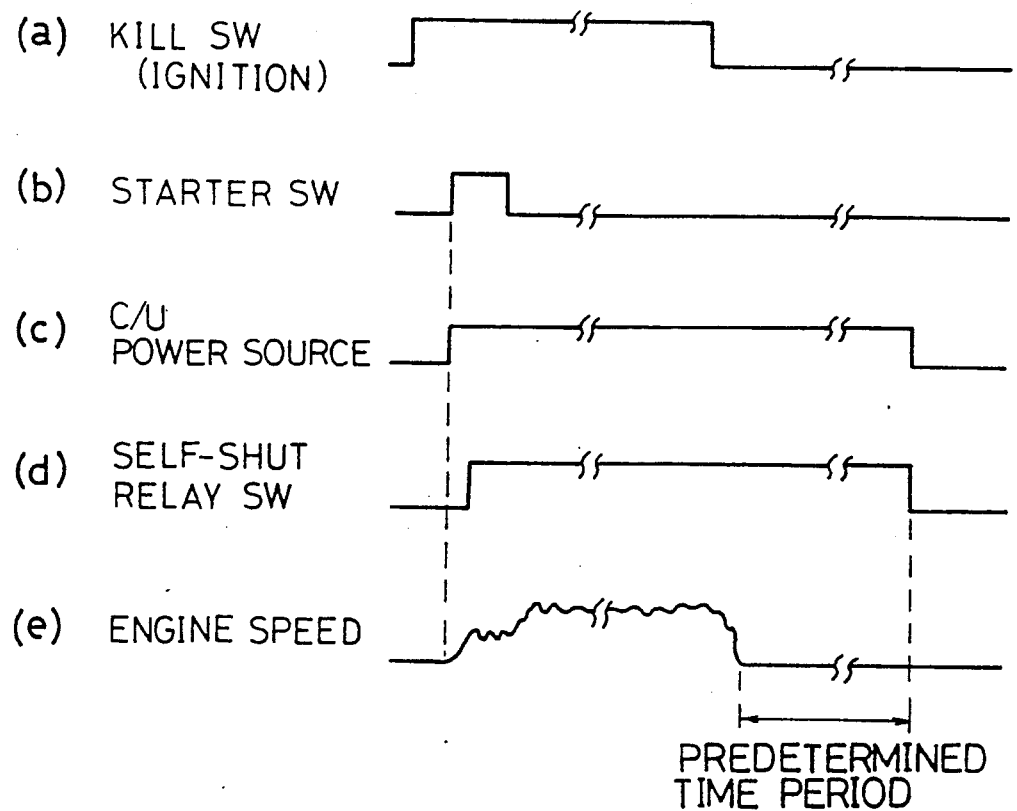
FIGS. 4A to 4E are time charts for explaining the operations of the same embodiment.

According to this embodiment, as shown in FIG. 3, there are added a starter switch 9, which is connected between the power source 1 and the supply terminal B and with the signal input terminal IN of the control circuit, and a starter 10. Moreover, the power source 1 is connected with not only a CDI unit 11 acting as the ignition circuit but also a kill switch 12.

The remaining structure is similar to that of the first feature of the present invention shown in FIG. 1.

The operations of this embodiment will be described in the following. If the kill switch 12 is turned on to turn on the starter switch 9, the engine running signal at the High level is fed to the signal input terminal so that the power source 1 is supplied to the control unit 2. Since the signal at the High level is then fed from the signal output terminal OUT to the control terminal of the transistor 8, this transistor 8, is rendered conductive to supply the power source 1 to the relay coil 3b of the self-shut relay switch 3 to turn on this relay switch 3.

From now on, the power to the control unit 2 is continuously held even if the starter switch 9 is turned off. After this, the engine starts its revolutions.

The engine is stopped by turning off the kill switch 12. After lapse of a predetermined time period from the engine stop, the signal at the Low level is fed from the signal output terminal OUT to the control terminal of the transistor 8. Then, this transistor 8 is rendered inconductive to interrupt the power to the relay coil 3b of the self-shut relay switch 3 so that this relay switch 3 is turned off. As a result, the power to the control unit 2 is interrupted.

In case the engine stalls or is stopped by using the aforementioned kill switch 12, the power to the control unit 2 is interrupted after lapse of the predetermined time period from the engine stop. Thus, it is possible to eliminate the problem that the battery will die.

Incidentally, there exists another system (of self-shut type) for holding the power to the control unit by itself after the OFF of the engine key for a restart independently of the engine stalling. If this system is held for a long self-shut time, a weak battery would easily die.

If the voltage of the battery power source measured drops to a certain or lower level (e.g., 10 V), the battery is protected by releasing the held power to the control unit.

In this case, this operation is indicated at the time of the restart so that the driver or the like may be formed of the fact.

According to the automatic power interrupting system for a vehicular control circuit, as has been described hereinbefore, the power to the control circuit can be interrupted even in case the engine stalls or is left as it is stopped by using the kill switch or the like. Thus, the problem of the death of the battery can be eliminated to improve the restartability with remarkable effects in the practice.

What is claimed is:

1. An automatic power interrupting system for a vehicular control circuit, comprising: a relay switch having a normally open contact connected between a power source and the supply terminal of a control circuit and a relay coil connected with said power source; a normally open control switch connected between said power source and said supply terminal and with the signal input terminal of said control circuit and adapted to be turned on only when an external force is applied thereto; revolution detecting means for detecting the revolutions of an engine; and switching means for turning on said relay switch, when the power is supplied to said control circuit, and off said relay switch after a predetermined time period by measuring the time period after the stop of the engine revolutions on the basis of a detection signal outputted from said revolution detecting means.

2. An automatic power interrupting system for a vehicular control circuit comprising: a kill switch connected together with an ignition circuit with a power source; a relay switch having a normally open contact connected between said power source and the supply terminal of said control circuit and a relay coil connected between said power source and the signal output terminal of said control circuit; a starter switch connected together with a starter between said power source and said supply terminal and with the signal input terminal of said control circuit; revolution detecting means for detecting the revolutions of the engine; and switching means for turning on said relay switch, when the power is supplied to said control circuit, and off said relay switch afterr a predetermined time period by measuring the time period after the stop of the engine revolutions on the basis of a detection signal outputted from revolution detecting means.

* * * * *

UNITED STATES PATENT AND TRADEMARK OFFICE
CERTIFICATE OF CORRECTION

PATENT NO. : 5,048,503
DATED : Sep. 17, 1991
INVENTOR(S) : Suzuki et al.

It is certified that error appears in the above-identified patent and that said Letters Patent is hereby corrected as shown below:

On the title page:

Item 30, the FOREIGN APPLICATION PRIORITY DATA should read

--Dec. 1, 1989  [JP]   Japan.........1-138636  --.

Signed and Sealed this

Seventh Day of September, 1993

Attest:

BRUCE LEHMAN

*Attesting Officer*    Commissioner of Patents and Trademarks